(12) United States Patent
Rasset et al.

(10) Patent No.: US 11,701,933 B2
(45) Date of Patent: Jul. 18, 2023

(54) SAFETY CHAIN SYSTEM

(71) Applicant: CNH Industrial America LLC, New Holland, PA (US)

(72) Inventors: John Rasset, S Barnesville, MN (US); Chad Sietsema, Fargo, ND (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 0 days.

(21) Appl. No.: 17/460,432

(22) Filed: Aug. 30, 2021

(65) Prior Publication Data

US 2021/0387491 A1 Dec. 16, 2021

Related U.S. Application Data

(63) Continuation of application No. 16/271,229, filed on Feb. 8, 2019, now Pat. No. 11,104,190.

(51) Int. Cl.
*B60D 1/28* (2006.01)
*B60D 1/18* (2006.01)

(52) U.S. Cl.
CPC ............. *B60D 1/28* (2013.01); *B60D 1/187* (2013.01)

(58) Field of Classification Search
CPC .................................. B60D 1/18; B60D 1/187
USPC ....................................................... 280/480
See application file for complete search history.

(56) References Cited

U.S. PATENT DOCUMENTS

| | | | |
|---|---|---|---|
| 1,476,627 A | 12/1923 | Luebke et al. | |
| 2,570,680 A * | 10/1951 | Huizinga | A01K 1/064 24/604 |
| 3,265,407 A | 8/1966 | Conn | |
| 4,291,893 A * | 9/1981 | Hansen | B60D 1/28 280/507 |
| 5,716,066 A | 2/1998 | Chou et al. | |
| 5,732,967 A * | 3/1998 | Behling | B60D 1/60 280/480 |
| 6,017,071 A | 1/2000 | Morghen | |
| 6,672,609 B2 | 1/2004 | Pierman et al. | |
| 6,827,531 B2 | 12/2004 | Womack et al. | |
| 7,926,830 B2 * | 4/2011 | Hill | B60D 1/06 280/515 |
| 8,246,069 B2 | 8/2012 | Ladzinski et al. | |
| 9,221,312 B2 | 12/2015 | Sandberg et al. | |
| 9,499,020 B2 | 11/2016 | Degenkolb et al. | |
| 9,744,820 B1 * | 8/2017 | Robins | B60D 1/06 |
| 11,046,130 B2 * | 6/2021 | Burling | B60D 1/187 |
| 2005/0110240 A1 | 5/2005 | Dombos | |
| 2011/0265442 A1 * | 11/2011 | Segura | B66C 1/66 59/86 |
| 2020/0130439 A1 * | 4/2020 | Najarro | B60D 1/52 |
| 2021/0252926 A1 * | 8/2021 | McCarthy | B60D 1/18 |

* cited by examiner

*Primary Examiner* — Minnah L Seoh
*Assistant Examiner* — Hosam Shabara
(74) *Attorney, Agent, or Firm* — Rickard DeMille; Rebecca Henkel

(57) ABSTRACT

A safety chain system that includes a drawbar hanger. The drawbar hanger includes a drawbar frame that defines a first aperture. A drawbar rests within the first aperture. A safety chain anchor also rests within the first aperture. The safety chain anchor defines a second aperture. The second aperture receives a safety chain. The safety chain anchor is able to slide in and out of the first aperture.

19 Claims, 5 Drawing Sheets

US 11,701,933 B2

SAFETY CHAIN SYSTEM

CROSS-REFERENCE TO RELATED APPLICATION

The present application is a continuation of U.S. patent application Ser. No. 16/271,229, entitled "SAFETY CHAIN SYSTEM", filed Feb. 8, 2019, now U.S. Pat. No. 11,104,190 which issued on Aug. 31, 2021, which is hereby incorporated by reference in its entirety.

BACKGROUND

The present disclosure relates generally to agricultural implements, and more specifically to coupling of agricultural implements to agricultural vehicles.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Agricultural implements couple to tractors or other agricultural vehicles to perform an agricultural task (e.g., tilling, planting, seeding, spraying, fertilizing, harvesting, etc.). The agricultural implements typically couple to the tractors with a drawbar that provides a mechanical connection that enables the tractor to pull the agricultural implement. To provide redundant mechanical connection and block uncoupling between the agricultural vehicle and the agricultural implement, a safety chain may be used. The safety chain may couple to the drawbar hanger that supports the drawbar and to a connection point on the implement. The size of the safety chain depends on the weight of the agricultural implement being towed. Unfortunately, the apertures on drawbar hangers may not accommodate the large safety chains used when towing heavier implements.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a safety chain system that includes a drawbar hanger. The drawbar hanger includes a drawbar frame that defines a first aperture. A drawbar rests within the first aperture. A safety chain anchor also rests within the first aperture. The safety chain anchor defines a second aperture. The second aperture receives a safety chain. The safety chain anchor is able to slide in and out of the first aperture.

In another embodiment, a safety chain anchor that couples to a drawbar hanger. The safety chain anchor includes a first section and a second section with the first section defining a first width and the second section defining a second width. The first width is less than the second width to block removal of the safety chain anchor from the drawbar hanger in a first direction. The first section defines an aperture that receives a safety chain that couples an agricultural implement to the drawbar hanger.

In another embodiment, a safety chain anchor that couples to a drawbar hanger. The safety chain anchor includes a first section. The first section defines an aperture that receives a safety chain that couples an agricultural implement to the drawbar hanger. A second section couples to the first section with one or more fasteners. A combined width of the first section and the second section blocks removal of the safety chain anchor from the drawbar hanger in a first direction.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

A tractor or other agricultural vehicle may tow or support an implement and move the implement through a field to perform an agricultural task. The tractor couples to the agricultural implement with a drawbar and a hitch, which forms a mechanical connection enabling the tractor to pull the agricultural implement. In addition to the drawbar, the tractor may couple to the agricultural implement with a safety chain. The safety chain provides redundant mechanical coupling of the tractor to the agricultural implement. The size of the safety chain depends on the weight of the agricultural implement being towed. As will be explained below, the safety chain system includes a safety chain anchor that may be installed retroactively on an existing tractor (e.g., drawbar hanger) to enable coupling of large safety chains to the tractor.

Figure 1:
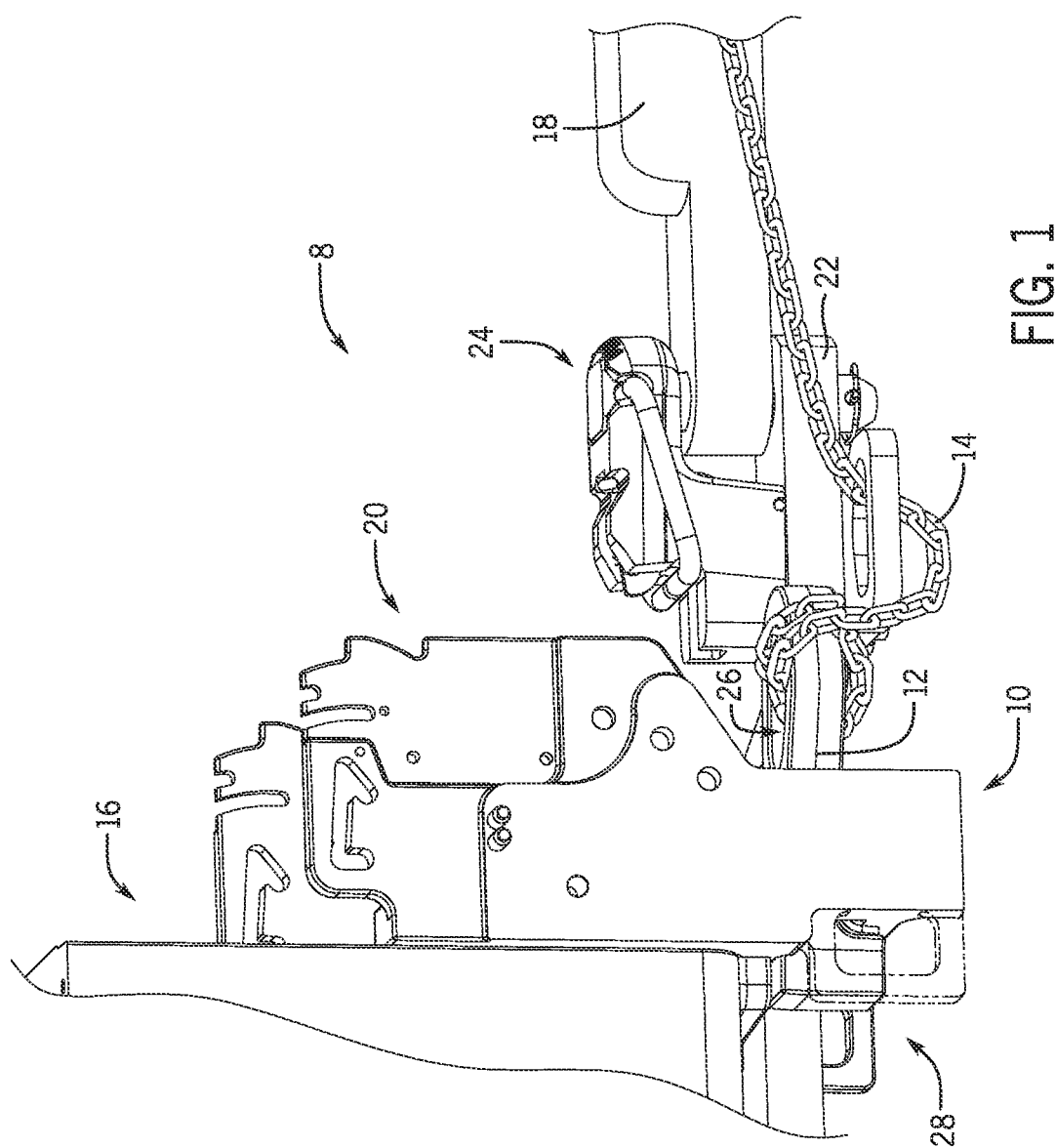
FIG. 1 is a perspective view of an agricultural system with a safety chain anchor coupled to a drawbar hanger of a tractor, in accordance with an embodiment.

FIG. 1 is a perspective view of an agricultural system 8 with a safety chain system 10. The safety chain system 10 includes a safety chain anchor 12 that enables a safety chain 14 to couple a tractor 16 (e.g., work vehicle) to an agricultural implement 18. As illustrated, the safety chain anchor 12 couples to a drawbar hanger 20 of a tractor 16. The drawbar hanger 20 supports the drawbar 22 as well as the safety chain anchor 12. The drawbar 22 in turn supports the hitch 24. The hitch 24 enables the tractor 16 to couple to the agricultural implement 18. The hitch 24 and drawbar 22 provide the primary connection between the tractor 16 and the agricultural implement 18, while the safety chain 14 provides a secondary connection between the tractor 16 and the agricultural implement 18.

In operation, the safety chain 14, like the drawbar 22 and hitch 24, block separation of the agricultural implement 18 from the tractor 16. The safety chain 14 extends between a connection point on the agricultural implement 18 and the drawbar hanger 20. To facilitate the coupling of the safety chain 14 to the tractor 16, the safety chain system 10 includes the safety chain anchor 12, which provides an aperture 26 through which the safety chain 14 may be threaded and anchored to. As will be explained below, the safety chain anchor 12 may be retroactively coupled to the drawbar hanger 20 to enable larger safety chains to be used when heavier implements are coupled to the tractor 16. For example, some safety chains may have a size that prevents them from being threaded through a drawbar aperture 28 on the drawbar hanger 20.

Figure 2:
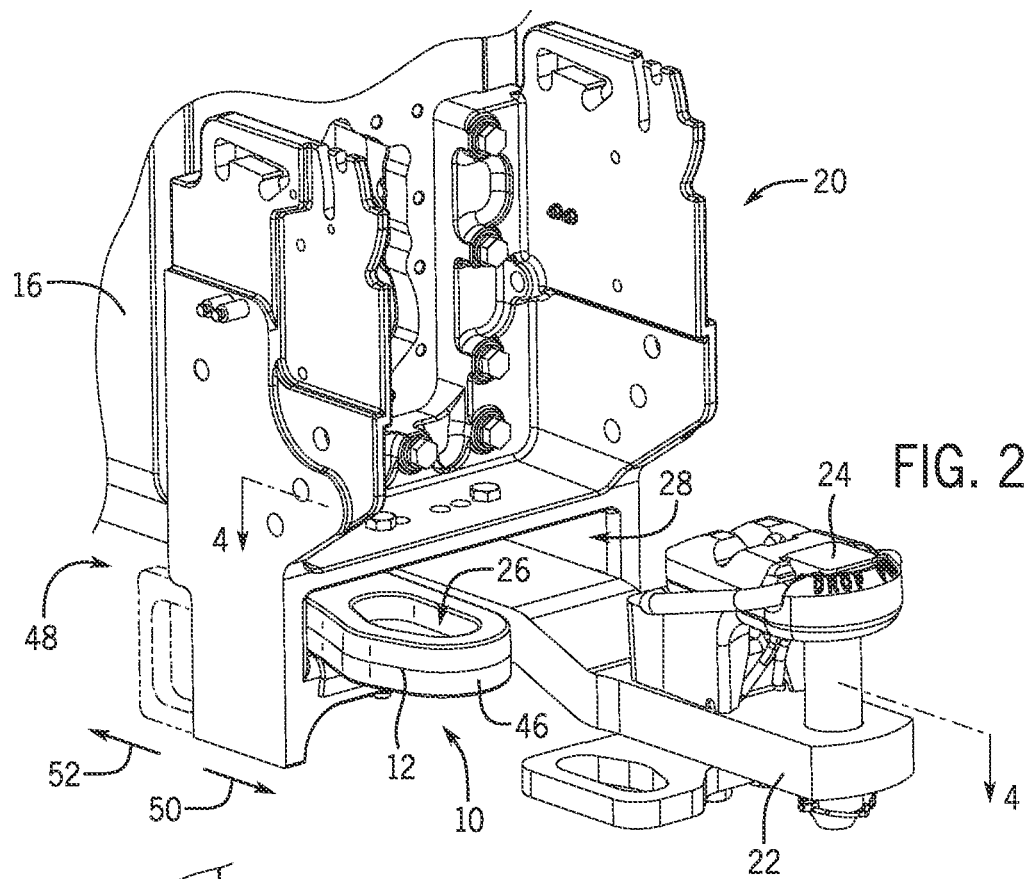
FIG. 2 is a front perspective view of a safety chain anchor coupled to a drawbar hanger of a tractor, in accordance with an embodiment.

FIG. 2 is a front perspective view of the safety chain anchor 12 coupled to a drawbar hanger 20 of the tractor 16. As illustrated, the safety chain anchor 12 rests within the drawbar aperture 28 of the drawbar hanger 20. In this position, the safety chain anchor 12 enables attachment of the safety chain 14. As will be explained below, the safety chain anchor 12 defines a shape that enables a first end 46 of the safety chain anchor 12 to be inserted into the drawbar aperture 28 in direction 50, but blocks removal/the ability of the second end 48 of the safety chain anchor 12 to pass through the drawbar aperture 28 in direction 50. Instead, the safety chain anchor 12 is removed from the drawbar hanger 20 in direction 52. In this way, the safety chain anchor 12 forms a connection point between the tractor 16 and the agricultural implement 18 with the safety chain 14.

Figure 3:
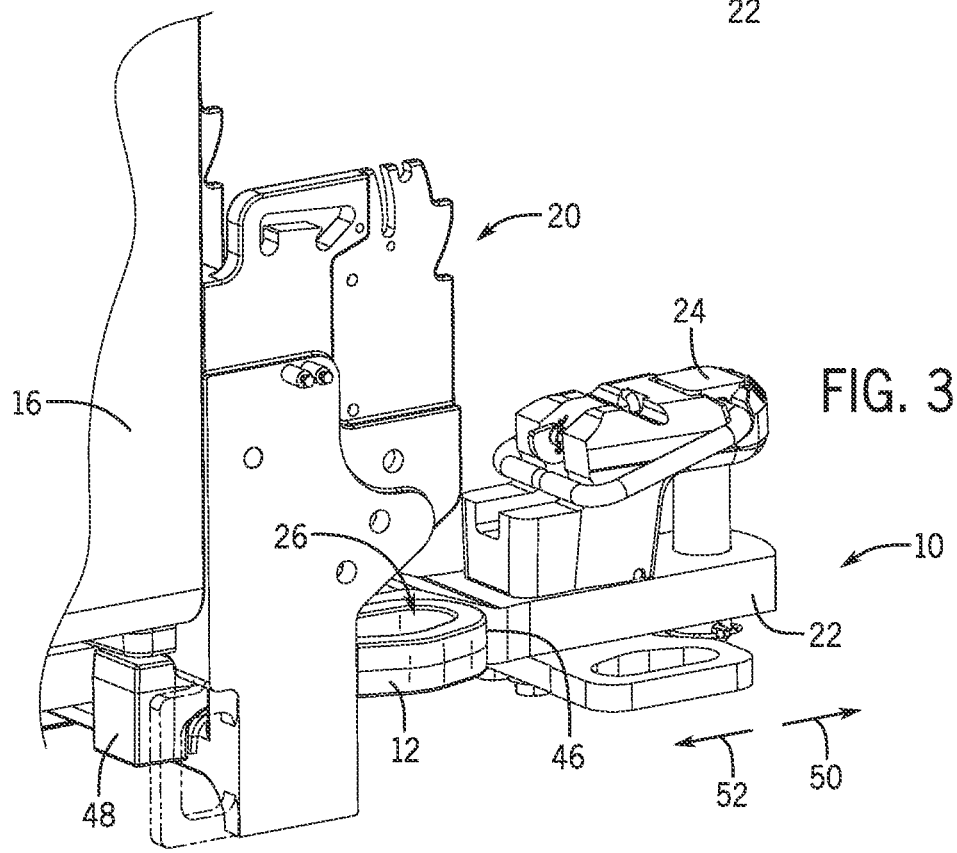
FIG. 3 is a rear perspective view of a safety chain anchor coupled to a drawbar hanger of a tractor, in accordance with an embodiment.

FIG. 3 is a rear perspective view of the safety chain anchor 12 coupled to a drawbar hanger 20 of the tractor 16. As illustrated, the safety chain anchor 12 defines a shape that enables a first end 46 of the safety chain anchor 12 to be inserted into the drawbar aperture 28 in direction 50, but blocks removal of the safety chain anchor 12 from the drawbar hanger 20 in direction 50. In other words, the second end 48 is larger than the drawbar aperture 28, which blocks removal of the safety chain anchor 12 in direction 50. This enables the safety chain anchor 12 to transfer force from the safety chain 14 to the drawbar hanger 20 and ultimately to the tractor 16.

Figure 4:
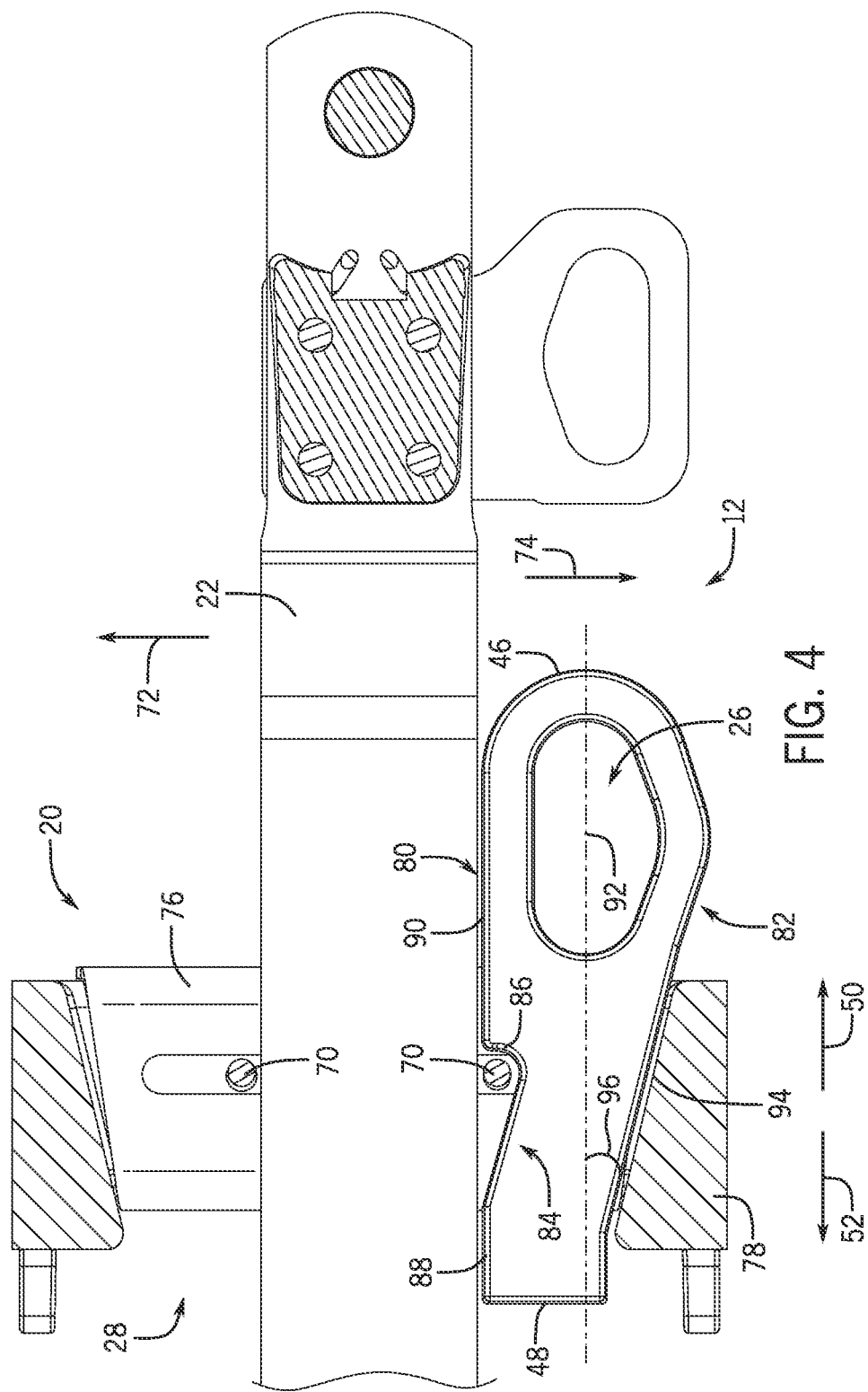
FIG. 4 is a cross-sectional view of a safety chain anchor coupled to a drawbar hanger, in accordance with an embodiment.

FIG. 4 is a cross-sectional view of the safety chain anchor 12 coupled to a drawbar hanger 20. As illustrated, the drawbar 22 extends through the drawbar aperture 28 of the drawbar hanger 20. The drawbar 22 is held in place within the drawbar aperture 28 with pins or bolts 70. These pins 70 block and/or reduce movement of the drawbar 22 in directions 72 and 74. In some embodiments, the drawbar hanger 20 may include a wear plate 76 that blocks and/or reduces wear of the drawbar hanger 20 from movement of the drawbar 22 and/or the safety chain anchor 12. In some embodiments, the pins 70 may also facilitate retention of the safety chain anchor 12.

As illustrated, the safety chain anchor 12 rests between the drawbar 22 and a sidewall 78 of the drawbar hanger 20 with a first sidewall 80 proximate the drawbar 22 and a second sidewall 82 proximate the sidewall 78 of the drawbar hanger 20. In some embodiments, the first sidewall 80 of the safety chain anchor 12 may include a groove 84 that forms a ledge 86. The groove 84 enables a bolt 70 to be inserted between the drawbar 22 and the safety chain anchor 12. Once inserted, the bolt 70 blocks movement of the drawbar 22 in direction 74 in addition to blocking retraction of the safety chain anchor 12 in direction 52. The first sidewall 80 may also include straight portions 88 and 90 relative to a longitudinal axis 92 of the safety chain anchor 12. These straight portions 88 and 90 are on opposite sides of the groove 84. During operation, these straight portions 88 and 90 may contact the drawbar 22, which may block or reduce rotation of the safety chain anchor 12 within the drawbar aperture 28. The second sidewall 82 may include an angled portion 94 relative to the longitudinal axis 92. An angle 96 formed between the angled portion 94 and the longitudinal axis 92 may be similar to or the same angle as the sidewall 78 with respect to the longitudinal axis 92. The angled portion 94 of the second sidewall 82 may therefore contact the sidewall 78 to block rotation of the safety chain anchor 12 during operation of the agricultural system 8. The angled portion 94 may also block retraction of the safety chain anchor 12 in direction 52 by contacting the sidewall 78 of the drawbar hanger 20. In other words, the safety chain anchor 12 may be captured between the drawbar 22 and the drawbar hanger 20 after installation.

Figure 5:
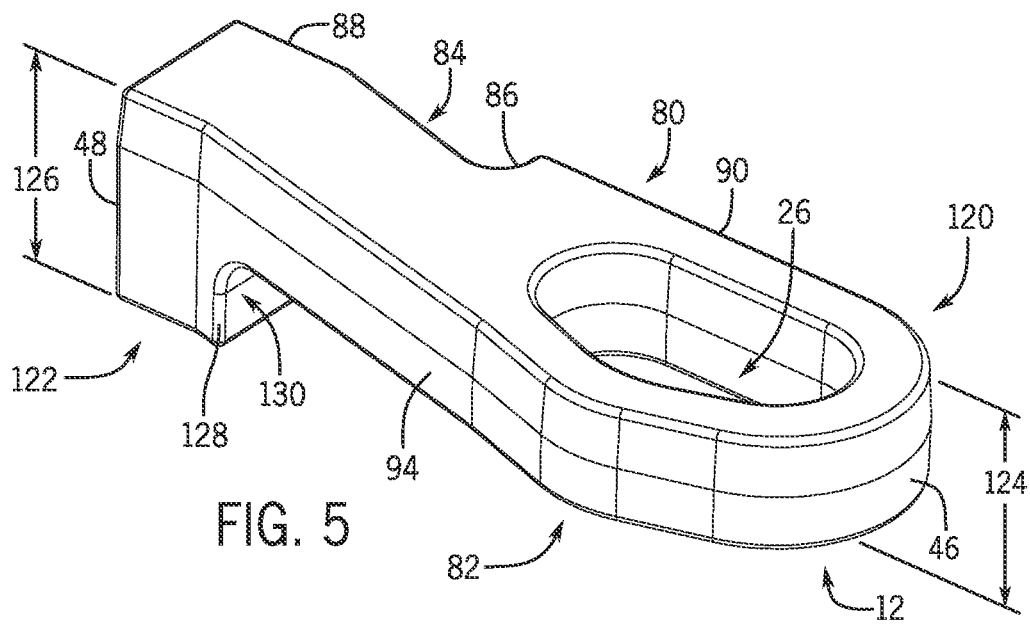
FIG. 5 is a perspective view of a safety chain anchor, in accordance with an embodiment.

FIG. 5 is a perspective view of the safety chain anchor 12. As illustrated, the safety chain anchor 12 includes a first portion or section 120 and a second portion or section 122. The first portion 120 defines the aperture 26 (e.g., D-shaped aperture) that receives the safety chain 14. The first portion 120 defines a width 124. The width 124 of the first portion 120 is less than the width 126 of the second portion 122. These differences in widths enables the first portion 120 to extend into the drawbar aperture 28 of the drawbar hanger 20 while simultaneously blocking the second portion 122 from passing through the drawbar aperture 28. The second portion 122 is therefore able to transfer force from a safety chain 14 to the tractor 16 through contact with the drawbar hanger 20. More specifically, the safety chain anchor 12 may contact and transfer force from the safety chain anchor 12 to the drawbar hanger 20 by contact with the ledge 128 of the second portion 122.

In some embodiments, the safety chain anchor 12 may also define a curved transition 130 between the ledge 128 and the first portion 120. The curved transition 130 may define a radius of curvature that is less than a radius of curvature on the wear plate 76 or the drawbar hanger 20. A smaller radius of curvature may block or reduce rotation of the safety chain anchor 12 about the wear plate 76 and/or the drawbar hanger 20 during operation. By blocking and/or reducing rotation, the safety chain anchor 12 focuses the transfer of force from the safety chain anchor 12 to the drawbar hanger 20 through contact with the ledge 128. As illustrated, the safety chain anchor 12 may be one-piece or integral. For example, the safety chain anchor 12 may be cast and/or machined from a single piece of material.

Figure 6:
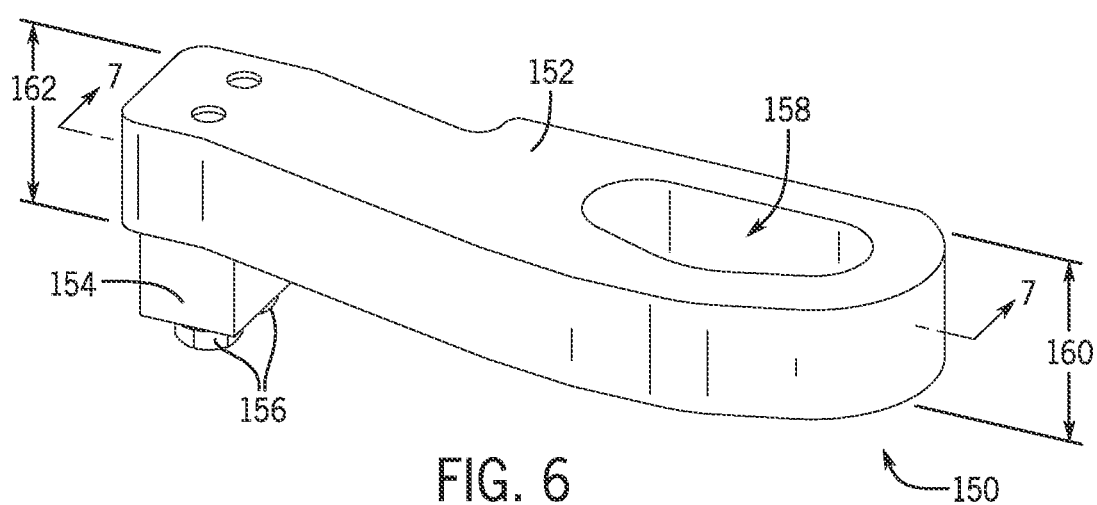
FIG. 6 is a perspective view of a safety chain anchor, in accordance with an embodiment.

FIG. 6 is a perspective view of a safety chain anchor 150. As illustrated, the safety chain anchor 150 may be formed from multiple pieces. For example, the safety chain anchor 150 may include a base section 152 and a ledge section 154. The base section 152 and the ledge section 154 couple together with one or more fasteners 156 (e.g., threaded fasteners). As illustrated, the base section 152 defines the aperture 158 that receives the safety chain 14. The base section 152 may have a uniform width 160. This width 160 enables the base section 152 to extend into the drawbar aperture 28 of the drawbar hanger 20. To block the base section 152 from completely passing through the drawbar aperture 28 on the drawbar hanger 20, the ledge section 154 couples to the base section 152. The ledge section 154 has a width 162, which when coupled to the base section 152 forms an overall width 164 that blocks passage of the safety chain anchor 150 through the drawbar aperture 28. The ledge section 154 therefore enables the transfer of force from a safety chain 14 to the tractor 16 through contact with the drawbar hanger 20.

Figure 7:
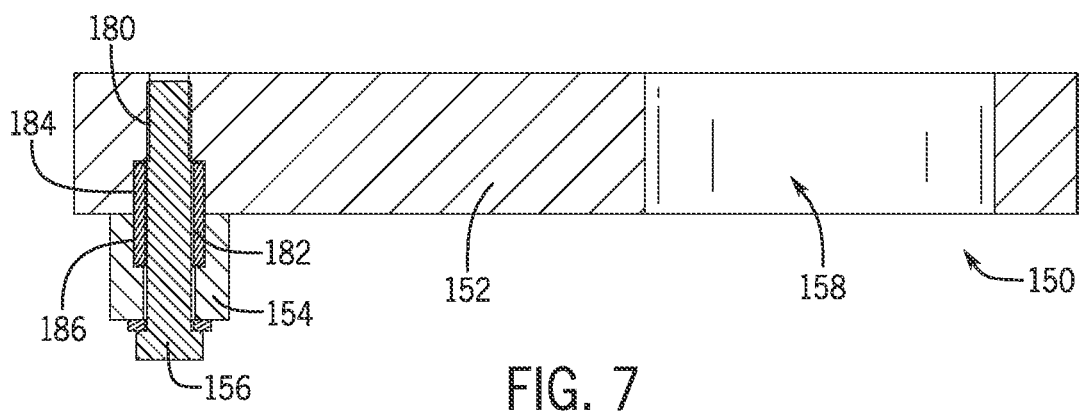
FIG. 7 is a cross-sectional view of the safety chain anchor in FIG. 6 along line 7-7, in accordance with an embodiment.

FIG. 7 is a cross-sectional view of the safety chain anchor 150 in FIG. 6 along line 7-7. As illustrated, the ledge section 154 couples to the base section 152 with one or more fasteners 156. The fasteners 156 may be threaded fasteners that extend into apertures 180 on the base section 152. The safety chain anchor 150 may also include bushings 182 that facilitate coupling and force transmission between the base section 152 and the ledge section 154. The bushings 182 rest within a counterbore 184 on the base section 152 and in a counterbore 186 on the ledge section 154. These counterbores 184, 186 may extend less than half of the width of the respective base section 152 and ledge section 154. In some embodiments, the bushings 182 may be threaded bushings that threadingly couple to the base section 152 and to the ledge section 154.

Figure 8:
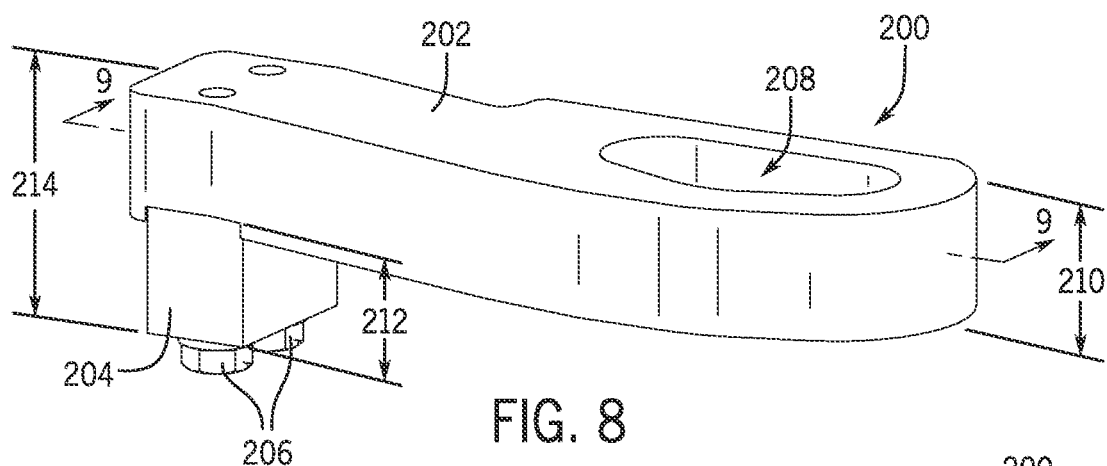
FIG. 8 is a perspective view of a safety chain anchor, in accordance with an embodiment.

FIG. 8 is a perspective view of a safety chain anchor 200. As illustrated, the safety chain anchor 200 may also be formed from multiple pieces. For example, the safety chain anchor 200 may include a base section 202 and a ledge section 204. The base section 202 and the ledge section 204 couple together with one or more fasteners 206 (e.g., threaded fasteners). As illustrated, the base section 202 defines the aperture 208 that receives the safety chain 14. The base section 202 may have a width 210. This width 210 enables the base section 202 to extend into the drawbar aperture 28 of the drawbar hanger 20. To block the base section 202 from completely passing through the drawbar aperture 28 on the drawbar hanger 20, the ledge section 204 couples to the base section 202. The ledge section 204 has a width 212, which when coupled to the base section 202 forms an overall width 214 that blocks passage of the safety chain anchor 200 through the drawbar aperture 28 of the drawbar hanger 20. The ledge section 204 therefore enables the transfer of force from the safety chain 14 to the tractor 16 through contact with the drawbar hanger 20.

Figure 9:
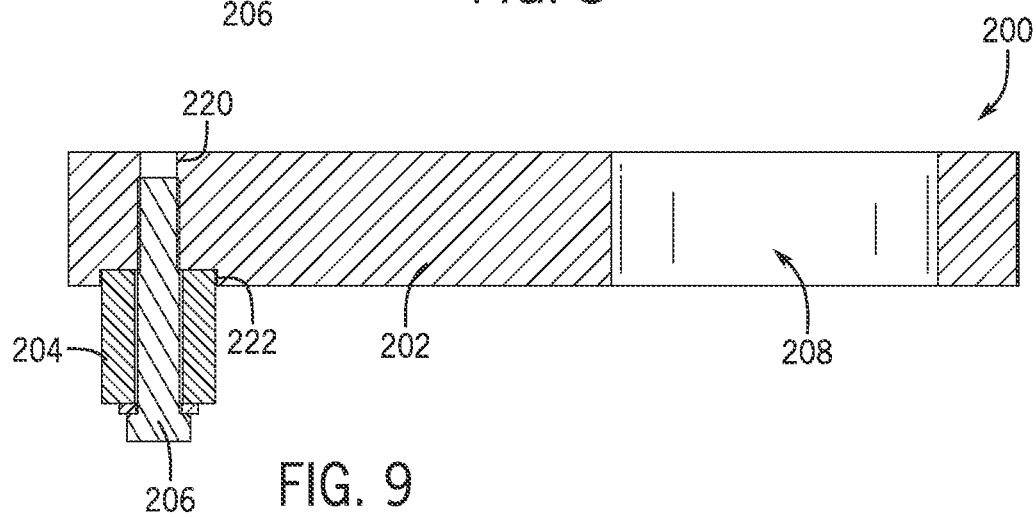
FIG. 9 is a cross-sectional view of the safety chain anchor in FIG. 8 along line 9-9, in accordance with an embodiment.

FIG. 9 is a cross-sectional view of the safety chain anchor 200 in FIG. 8 along line 9-9. As illustrated, the ledge section 204 couples to the base section 202 with one or more fasteners 206. The fasteners 206 may be threaded fasteners that extend into apertures 220 on the base section 202. As illustrated, the ledge section 204 may rest within a keyway or groove 222 in the base section 202. The groove 222 may facilitate alignment, coupling, and force transmission between the base section 202 and the ledge section 204.

Figure 10:
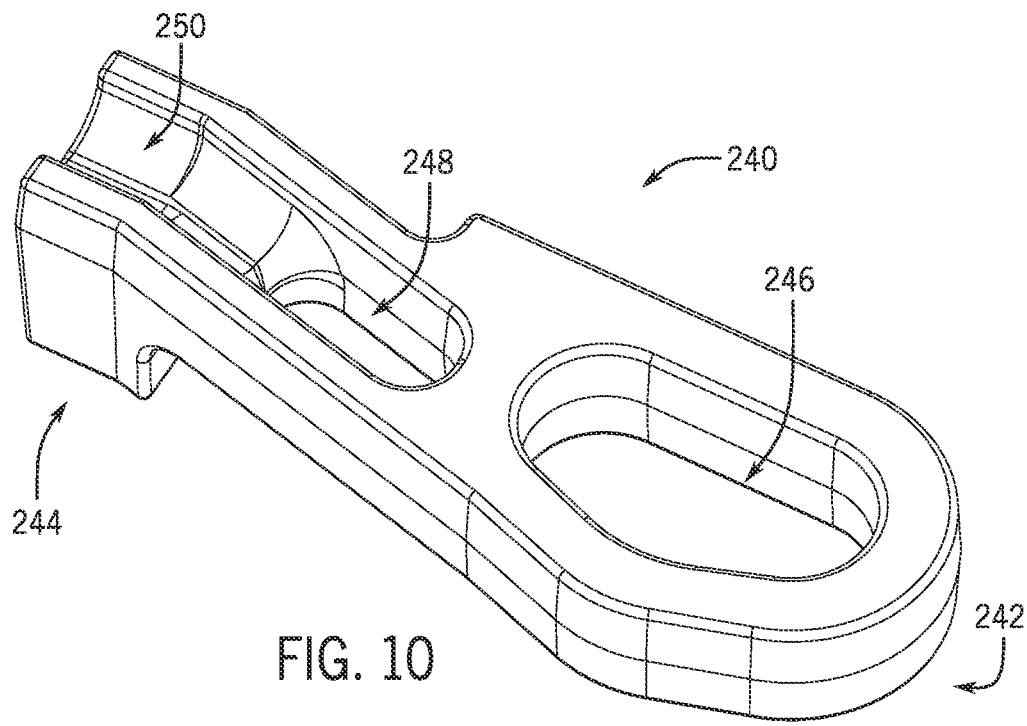
FIG. 10 is a perspective view of a safety chain anchor, in accordance with an embodiment.

FIG. 10 is a perspective view of a safety chain anchor 240. As illustrated, the safety chain anchor 240 includes a first portion or section 242 and a second portion or section 244 (e.g., ledge section). The first portion 242 defines the aperture 246 (e.g., D-shaped aperture) that receives the safety chain 14. The first portion 242 may also include a second aperture 248 in order to reduce the weight of the safety chain anchor 240. In addition to the second aperture 248, the safety chain anchor 240 may include a groove 250 that extends through the first portion 242 and into the second section 244 and ending at the second aperture 248. This groove 250 may further reduce the weight of the safety chain anchor 240. As illustrated, the safety chain anchor 240 may be one-piece or integral. For example, the safety chain anchor 240 may be cast and/or machined from a single piece of material.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A safety chain anchor, comprising:
a first section and a second section with the first section defining a first width and the second section defining a second width, wherein the safety chain anchor is configured to couple to a drawbar hanger, the first width is less than the second width to block removal of the safety chain anchor from the drawbar hanger in a first direction, and the first section defines a first aperture configured to receive a safety chain that couples an agricultural implement to the drawbar hanger and defines a second aperture configured to reduce a weight of the safety chain anchor;
wherein the safety chain anchor defines a ledge, and the ledge is configured to contact a pin or bolt to block removal of the safety chain anchor from the drawbar hanger in a second direction, opposite the first direction.

2. The safety chain anchor of claim 1, wherein the first aperture defines a D-shape.

3. The safety chain anchor of claim 1, wherein the safety chain anchor is one-piece.

4. The safety chain anchor of claim 1, wherein the safety chain anchor defines a curved surface between the first section and the second section.

5. A safety chain anchor, comprising:
a first section and a second section with the first section defining a first width and the second section defining a second width, wherein the safety chain anchor is configured to couple to a drawbar hanger, the first width is less than the second width to block removal of the safety chain anchor from the drawbar hanger in a first direction, and the first section defines a first aperture configured to receive a safety chain that couples an agricultural implement to the drawbar hanger;

wherein:
the safety chain anchor defines a curved surface between the first section and the second section and a ledge,
the ledge is configured to contact a pin or bolt to block removal of the safety chain anchor from the drawbar hanger in a second direction, opposite the first direction, and
the curved surface defines a radius of curvature that is less than a radius of curvature of a drawbar hanger portion configured to contact the safety chain anchor.

6. The safety chain anchor of claim 5, wherein the first section defines a second aperture, and the second aperture is configured to reduce a weight of the safety chain anchor.

7. A safety chain anchor configured to couple to a drawbar hanger, the safety chain anchor comprising:
a first section, the first section defining an aperture configured to receive a safety chain that couples an agricultural implement to the drawbar hanger and defining a groove configured to receive the second section; and
a second section configured to couple to the first section with one or more fasteners, wherein a combined width of the first section and the second section is configured to block removal of the safety chain anchor from the drawbar hanger in a first direction;
wherein the safety chain anchor defines a ledge, and the ledge is configured to contact a pin or bolt to block removal of the safety chain anchor from the drawbar hanger in a second direction, opposite the first direction.

8. The safety chain anchor of claim 7, wherein the aperture defines a D-shape.

9. The safety chain anchor of claim 7, wherein the first section has a uniform width.

10. The safety chain anchor of claim 7, comprising the one or more fasteners, wherein the one or more fasteners are threaded.

11. A safety chain anchor configured to couple to a drawbar hanger, the safety chain anchor comprising:
a first section, the first section defining an aperture configured to receive a safety chain that couples an agricultural implement to the drawbar hanger;
a second section configured to couple to the first section with one or more fasteners, wherein a combined width of the first section and the second section is configured to block removal of the safety chain anchor from the drawbar hanger in a first direction; and
one or more bushings, wherein each bushing of the one or more bushings is configured to be disposed about a respective fastener of the one or more fasteners,
wherein the safety chain anchor defines a ledge, and the ledge is configured to contact a pin or bolt to block removal of the safety chain anchor from the drawbar hanger in a second direction, opposite the first direction.

12. A safety chain system, comprising:
a safety chain anchor configured to be disposed within an aperture of a drawbar hanger, the safety chain anchor comprises a first section and a second section with the first section defining a first width and the second section defining a second width, wherein the first and second sections are positioned on opposite longitudinal sides of the safety chain anchor, the first width of the first section of the safety chain anchor is configured to be less than a width of the aperture of the drawbar hanger to facilitate insertion of the first section into the aperture of the drawbar hanger in a first direction, the second width of the second section of the safety chain anchor is configured to be greater than the width of the aperture of the drawbar hanger to block removal of the safety chain anchor from the drawbar hanger in the first direction, and the first section defines an aperture of the safety chain anchor configured to receive a safety chain that couples an agricultural implement to the drawbar hanger.

13. The safety chain system of claim 12, wherein the aperture of the safety chain anchor defines a D-shape.

14. The safety chain system of claim 12, wherein the safety chain anchor is one-piece.

15. The safety chain system of claim 12, wherein the safety chain anchor defines a curved surface between the first section and the second section.

16. The safety chain system of claim 12, wherein the curved surface defines a radius of curvature that is less than a radius of curvature of a drawbar hanger portion configured to contact the safety chain anchor.

17. The safety chain system of claim 12, wherein the safety chain anchor defines a ledge, and the ledge is configured to contact a pin or bolt to block removal of the safety chain anchor from the drawbar hanger in a second direction, opposite the first direction.

18. The safety chain system of claim 12, wherein the first section of the safety chain anchor defines a second aperture of the safety chain anchor, and the second aperture of the safety chain anchor is configured to reduce a weight of the safety chain anchor.

19. The safety chain system of claim 12, comprising a drawbar configured to be disposed within the aperture of the drawbar hanger.

* * * * *